(12) United States Patent
Radich

(10) Patent No.: US 7,468,018 B2
(45) Date of Patent: Dec. 23, 2008

(54) SYSTEM AND METHOD FOR MATCHING ENGINE SPEED TO VEHICLE SPEED WITH A MANUAL TRANSMISSION

(76) Inventor: Anthony Francis Radich, 5440 Marinelli Rd., Apt. 411, North Bethesda, MD (US) 20852

( * ) Notice: Subject to any disclaimer, the term of this patent is extended or adjusted under 35 U.S.C. 154(b) by 398 days.

(21) Appl. No.: 11/368,749

(22) Filed: Mar. 6, 2006

(65) Prior Publication Data

US 2007/0207896 A1   Sep. 6, 2007

(51) Int. Cl.
*B60W 10/00* (2006.01)
*B60W 10/04* (2006.01)
*B60W 10/10* (2006.01)
*G06F 7/00* (2006.01)
*G06F 17/00* (2006.01)
*G06F 19/00* (2006.01)

(52) U.S. Cl. .......................... 477/78; 477/110; 701/54; 701/58

(58) Field of Classification Search .................. 477/78, 477/107, 110, 11, 115; 701/51, 53, 54, 58
See application file for complete search history.

(56) References Cited

U.S. PATENT DOCUMENTS

| | | | | | |
|---|---|---|---|---|---|
| 4,740,898 | A | * | 4/1988 | McKee et al. | 701/70 |
| 5,389,051 | A | * | 2/1995 | Hirate et al. | 477/111 |
| 5,680,307 | A | * | 10/1997 | Issa et al. | 701/52 |
| 5,681,240 | A | * | 10/1997 | Sunada et al. | 477/125 |
| 5,916,292 | A | * | 6/1999 | Issa et al. | 701/62 |

\* cited by examiner

*Primary Examiner*—Tisha D Lewis
(74) *Attorney, Agent, or Firm*—Tiep H. Nguyen; Mannava & Kang, P.C.

(57) ABSTRACT

A method of automatically matching engine speed to vehicle speed while a manual transmission is shifted. The currently selected speed ratio is determined from the ratio of engine speed and vehicle speed. The operator initiates a shift by disengaging the clutch. The operator's throttle inputs before and after clutch disengagement imply whether he wishes an upshift of one speed ratio or a downshift of one or two speed ratios. While the clutch is disengaged, the engine computer acts to bring the engine to the speed needed for smooth reengagement of the clutch. Engine speed control returns to the operator upon clutch engagement.

20 Claims, 9 Drawing Sheets

SYSTEM AND METHOD FOR MATCHING ENGINE SPEED TO VEHICLE SPEED WITH A MANUAL TRANSMISSION

BACKGROUND OF THE INVENTION

1. Field of the Invention

The present invention relates generally to the operation of a manual transmission in a motor vehicle. More particularly, the invention is directed to a system and method of automatically matching engine speed to vehicle speed of a motor vehicle while an operator shifts a manual transmission in the vehicle.

2. Background

Conventional motor vehicles, such as automobiles, typically have engines that produce low torque over a fairly narrow range of high engine speeds. However, high torque and a broad range of lower speeds at the drive wheels are required to move an automobile. Thus, the high-speed low engine torque is converted to a low-speed high wheel torque suitable for a variety of driving conditions by a multiple-speed drivetrain in the automobile. A variable-speed-ratio transmission and a pair of final drive gears are the typical elements in such a conventional drivetrain. A manual transmission is one major type of variable-speed-ratio transmission, wherein, as the name implies, the automobile operator must select from several speed ratios using a manual gear selector. The gear selector may be a hand lever that resembles a stick, as typically found in cars and trucks, or a foot pedal, as typically found on motorcycles.

A conventional manual transmission typically includes an input shaft driven by the engine, a layshaft driven by the input shaft, and one or more mainshafts driven by the layshaft. Mounted to the layshaft and mainshafts are several pairs of gears of different ratios in constant mesh. The input gear of each pair is solidly attached to the layshaft. These pairs of gears provide the forward speed ratios. A set of three gears driven by the layshaft and selectively driving the mainshaft provides a reverse speed ratio. The output gear in each pair is free to rotate about the mainshaft. A speed ratio, or "gear", is selected by locking one of the output gears to the mainshaft with toothed collars that are positioned by the gear selector. One gear is "higher" than another if the numeric ratio of input speed to mainshaft speed of the higher gear is lower relative to the lower gear. The gears are referenced in numeric sequence. The lowest is first gear, the next-lowest is second gear, and so on for all forward gears. Motor vehicles typically have multiple gears. For example, cars, light trucks, and motorcycles with manual transmissions generally have five or six forward gears.

Manual transmissions in motor vehicles may be synchronized, as in cars and lighter trucks, or unsynchronized, as in motorcycles, race cars, and heavy trucks. As a gear in a synchronized manual transmission is selected, an additional component called a synchronizer introduces friction between the gear and the engine output shaft in order to bring the gear speed to parity with the mainshaft speed before the collar is locked.

A clutch assembly (hereinafter, "clutch") is used to separate the engine and transmission input shaft while gears are changed. The operator releases the clutch by applying force to a foot pedal, usually found in cars and trucks, or to a hand lever, usually found on motorcycles. The clutch typically includes a flywheel and a pressure plate attached to the engine and a clutch plate attached to the transmission input shaft. The clutch is engaged by a spring that forces the pressure plate against the clutch plate, which in turn forces the clutch plate against the flywheel. Friction between the flywheel and clutch plate allows engine torque to flow to the rest of the drivetrain. The clutch is disengaged by a throw-out bearing that works against the spring to pull the pressure plate away from the clutch plate, eliminating the friction between the flywheel and the flow of engine torque to the transmission and effectively breaking the flow of torque to the drivetrain.

Conventionally, the process of shifting gears while the vehicle is in motion is as follows. The vehicle operator may initiate an upshift, i.e., a change from a lower gear to a higher gear, by decreasing the throttle input (e.g., releasing the gas pedal in a car) to reduce engine torque and disengaging the clutch (e.g., applying force to the clutch pedal in the car) to reduce the flow of engine torque to the drivetrain. Next, the operator moves the gear selector to the neutral position. Then, the operator further decreases the throttle input to reduce engine speed to match the lower transmission input shaft speed that is to result from the upshift. The lower transmission input shaft speed may be obtained by multiplying the rotational speed of the drive wheels, the final drive ratio, and the next transmission gear. The operator continues to move the gear selector from the neutral position to the position of the higher gear, i.e., the lower speed ratio, causing the collars to lock the newly selected gear to the output shaft. Finally, the operator reengages the clutch (e.g., releasing the clutch pedal in the car).

The operator may initiate a downshift, i.e., change from a higher gear to a lower gear, with one of two procedures. In the more frequently used procedure, the operator initiates the downshift by again decreasing the throttle input to reduce engine torque and disengaging the clutch to reduce the flow of engine torque to the drivetrain. Next, the operator moves the gear selector to the neutral position. Then, the operator increases the throttle input to increase engine speed to match the higher transmission input shaft speed that is to result from the downshift. Again, the higher transmission input shaft speed may be obtained by multiplying the rotational speed of the drive wheels, the final drive ratio, and the next transmission gear. The operator continues to move the gear selector from the neutral position to the position of the lower gear, i.e., the higher speed ratio, causing the collars to lock the newly selected gear to the output shaft. Finally, the operator reengages the clutch. This method is known as "single-clutching", since the clutch is disengaged once per shift.

The second method of downshifting requires the clutch to be disengaged twice and is therefore known as "double-clutching" or "double-declutching." The operator initiates the downshift by decreasing throttle input to reduce engine torque and disengaging the clutch to break the flow of engine torque to the drivetrain. Next, the operator increases the throttle input to increase engine speed to match the higher transmission input shaft speed that is to result from the downshift. Again, the input shaft speed is obtained by multiplying the rotational speed of the drive wheels, the final drive ratio, and the next transmission gear. At the same time, the operator shifts to neutral, reengages the clutch briefly and then disengages the clutch again. The engine speed that is needed to smoothly engage the clutch, once the shift is completed, is also the transmission input shaft speed that matches the output gear speed and the mainshaft speed in order to smoothly lock the gear collars. The engagement of the clutch with the transmission in neutral and with higher engine speed raises the speed of the output gear before it is locked to the output shaft. Next, the operator moves the gear selector from the neutral position to the position of the lower gear, and the clutch is released again. Compared to the single-clutch procedure, the double-clutch procedure eases the process of locking the collars of the newly selected gear to the output shaft.

SUMMARY OF THE INVENTION

Summary of the Problems

As mentioned earlier, the clutch plate is attached to the transmission input shaft, and the flywheel and the pressure plate are attached to the engine output shaft. While the clutch is disengaged and a gear is selected, the transmission input shaft speed is determined by the rotational speed of the drive wheels. Because the speeds of the two halves of the clutch assembly are determined by the speed of the engine and the speed of the wheels, respectively, the process is known as "matching engine speed to road speed" or "matching revs." Ideally, the speed of the flywheel and the pressure plate are to be equal to the clutch plate speed when the clutch is re-engaged. However, the operator is rarely able to achieve such equalization and instead relies on the actual clutch engagement to equate the flywheel and clutch plate speeds, which wears out the flywheel and the clutch plate and sends a shock through the drivetrain. In turn, the shock reduces the comfort of the vehicle occupants, may cause the drive,wheels to lose traction, and may upset the handling of the vehicle in a turn. Execution of downshift procedures while braking a car or truck is especially difficult because simultaneous operations of the throttle pedal, the clutch pedal, and the brake pedal are required.

U.S. Pat. No. 5,569,115 to Desautels et al. describes an engine speed synchronization system for manual transmissions, which aids clutchless shifting of a manual transmission in a heavy truck. Desautels et al. utilizes a shift intent switch on the shift lever, a position sensor in the transmission to determine when the shift lever has been moved to neutral, and a speed sensor on the transmission output shaft. The shift intent switch and transmission position sensor are not typically found on light vehicles. Thus, their incorporation may add manufacturing expense and requires an operator to re-learn how to shift. Furthermore, Desautels et al. does not provide a means for a two-gear downshift, and its engine speed synchronization process does not start until the transmission is in neutral, increasing the time required for synchronization.

Summary of the Solutions

The present invention advantageously addresses at least the above problems and other problems by utilizing an existing engine computer, such as an engine control unit (ECU), in a motor vehicle, to match the flywheel speed to the clutch plate speed in order to avoid the drivetrain shock upon clutch reengagement and to allow downshifts of one speed ratio without requiring a throttle input from the vehicle operator.

Accordingly, embodiments of the present invention provide a system and method of programming an automotive ECU to use sensors and controls available in today's motor vehicles to automatically bring engine speed to a desired proportion to the wheel rotational speed, i.e., to "match revs" or to "match engine speed to vehicle speed" during the shifting, up or down, of a manual transmission while the vehicle is in motion.

BRIEF DESCRIPTION OF THE DRAWINGS

Embodiments are illustrated by way of example and not limited in the following Figure(s), in which like numerals indicate like elements, in which.

DETAILED DESCRIPTION OF THE INVENTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Figure 1:
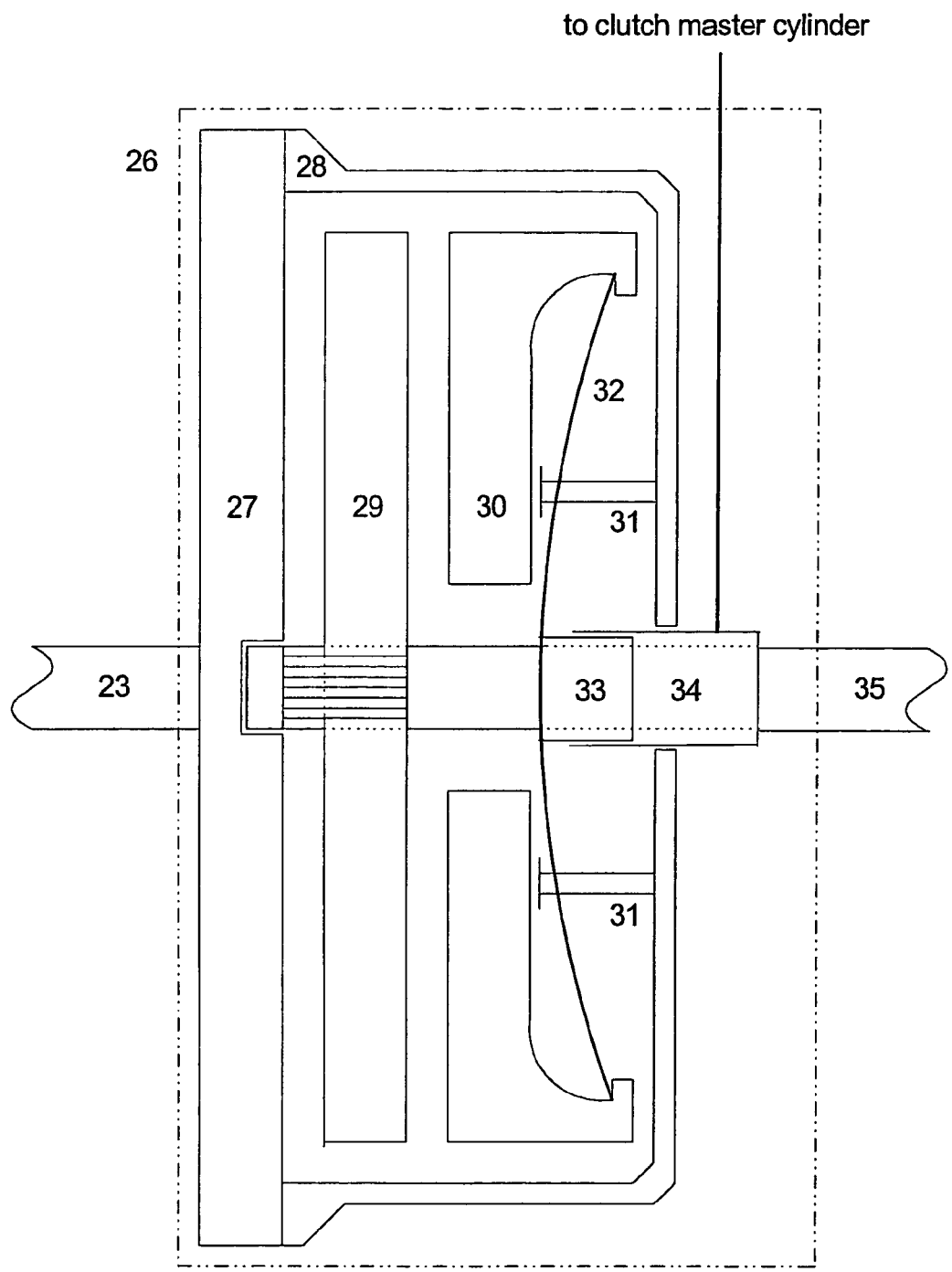
FIG. 1 depicts a typical clutch assembly in a motor vehicle, to which various embodiments of the present invention are applicable.

FIG. 1 depicts a side view of a typical clutch mechanism or assembly 26 in a motor vehicle, such as an automobile, to which embodiments of the present invention are applicable. FIG. 1 depicts the clutch assembly 26 in its disengaged position for illustrative purposes; however, it should be noted that the clutch assembly 26 is normally engaged. The vehicle operator is required to press and hold a clutch pedal or lever to disengage the clutch. As referred herein, an operator of a vehicle is the driver or any other entity that operates the vehicle. As shown in FIG. 1, the clutch assembly 26 is coupled to the vehicle's engine (not shown) at one end via an engine output shaft 23, which drives the flywheel 27. The clutch assembly 26 is also coupled to the vehicle's transmission at the other end via a transmission input shaft 35. The guide pins 31 are attached to the clutch cover 28, which is attached to flywheel 27. The clutch plate 29 is mounted to the transmission input shaft 35 with splines that allows it to move along the axis of the transmission input shaft 35. The force of the diaphragm spring 32 on the pressure plate 30 is operable to clamp the clutch plate 29 to the flywheel 27. Friction between the flywheel and clutch plate allows the transmission of engine torque from the engine output shaft 23 to the transmission input shaft 35. When the operator acts to disengage the clutch, pressurized fluid from a clutch master cylinder (not shown) flows into a slave cylinder 34, causing the throwout bearing 33 to press on the center of the diaphragm spring 32. The guide pins 31 cause the diaphragm spring 32 to pull the pressure plate 30 away from the clutch plate 29 when pressure is applied to the center of the diaphragm spring 32. This eliminates the friction between the flywheel 27 and the clutch plate 29, which then eliminates the flow of engine torque to the transmission input shaft 35.

Figure 2:
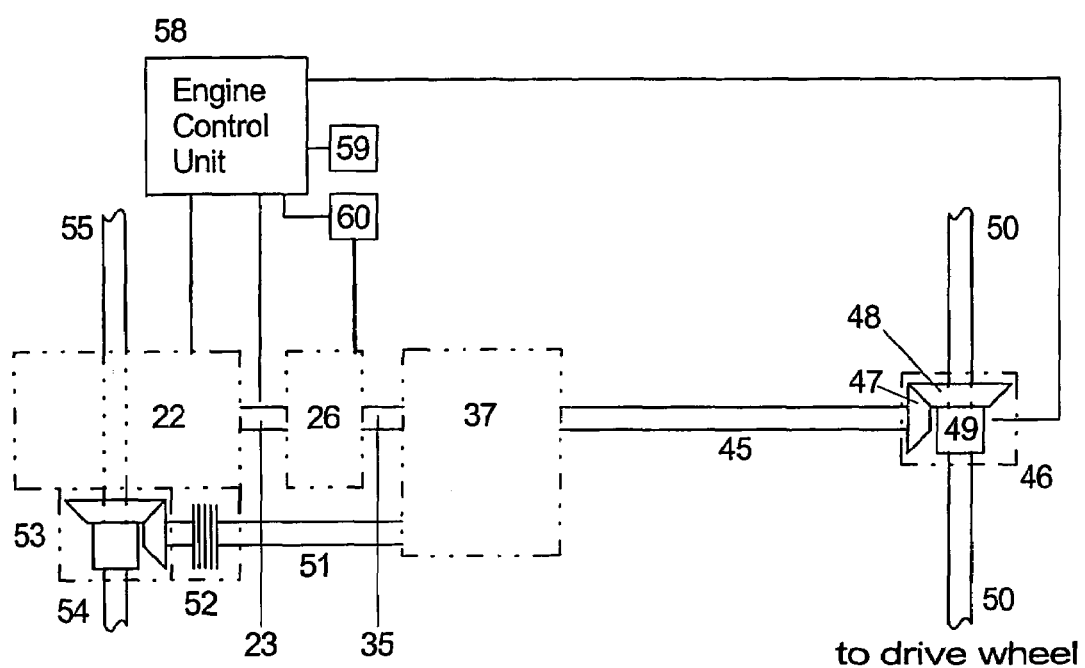
FIG. 2 depicts a typical all-wheel drive drivetrain system in a motor vehicle to which various embodiments of the present invention are applicable.

FIG. 2 depicts a typical drivetrain system 200 in an all-wheel-drive vehicle having an engine 22 with an engine output shaft 23. The drivetrain system 200 employs the clutch assembly 26, as detailed in FIG. 1, to selectively transmit engine torque to the transmission input shaft 35 which drives a five-speed manual transmission 37 with twin outputs, which in turn drives a rear driveshaft 45 (with the first output) and a front driveshaft 51 (with the second output) of the vehicle. The rear driveshaft 45 drives a rear differential assembly 46 having a pinion gear 47, a ring gear 48, and a differential 49. The rear differential assembly 46 apportions available torque and allows for speed differences between two rear half-shafts 50 that drive the vehicle's rear wheels. The front driveshaft 51 delivers torque to a front differential assembly 53 via an all-wheel-drive clutch 52, which sends torque to the front axle when the road is slippery and allows for speed differences between the rear driveshaft 45 and the front driveshaft 51 that occur when the vehicle is turning on a non-slippery surface. The front differential assembly 53 apportions available torque and allows for speed differences between the right front half-shaft 54 and the left front half-shaft 55 that drive the front wheels. The drivetrain system 200 includes an engine control unit (ECU) 58 that controls the speed of the engine 22, senses or detects engine speed at the engine output shaft 23 with an engine speed sensor (not shown), senses or detects vehicle speed at the differential 49, and receives inputs from the throttle position sensor 59 and the clutch position sensor 60 on the clutch master cylinder, as understood in the art. The engine speed sensor, the throttle position sensor, and the clutch position sensor may be electrical, mechanical, or electro-mechanical sensors known in the art.

Let the predetermined or predefined ratios of the transmission input speed (i.e., engine speed, when the clutch is engaged and not slipping) to the transmission output speed be designated as $r_1$, $r_2$, $r_3$, $r_4$, and $r_5$ for the five gears available with the 5-speed manual transmission 37, and the final drive ratio of the ring gear 48 to the pinion gear 47 be designated as $r_f$. Hence, the overall speed ratios of the drivetrain and corresponding designations are:

| | |
|---|---|
| $r_{1f} = r_1 * r_f$ | first gear; |
| $r_{2f} = r_2 * r_f$ | second gear; |
| $r_{3f} = r_3 * r_f$ | third gear; |
| $r_{4f} = r_4 * r_f$ | fourth gear; |
| $r_{5f} = r_5 * r_f$ | fifth gear. |

In an alternative embodiment, wherein the vehicle speed is sensed on the rear driveshaft 45 instead of the differential 49, the overall speed ratios of the drivetrain are the same as above but without the required $r_f$ term for each ratio.

A method for using an available ECU to automatically match engine speed to vehicle speed of a motor vehicle with a manual-transmission drivetrain, such as the drivetrain 200, is now described with reference to the process flows depicted in FIGS. 3-5, in accordance with one embodiment of the present invention. These process flows are continuously executed by the ECU 58 when the vehicle engine is running.

In one embodiment, the process flows may be implemented by a clutch-management module, which is one or more software programs, applications, or modules having computer-executable program instructions that include code from any suitable computer-programming language, such as C, C++, C#, Java, or the like, that is understood or compatible with any known processor in the ECU 58. The clutch-management module may be stored within the ECU, for example, in a memory chip in the ECU. However, alternative embodiments are contemplated whereby the clutch management module may be stored external to the ECU but remains accessible by the ECU for running the process flow 300.

Figure 3A:
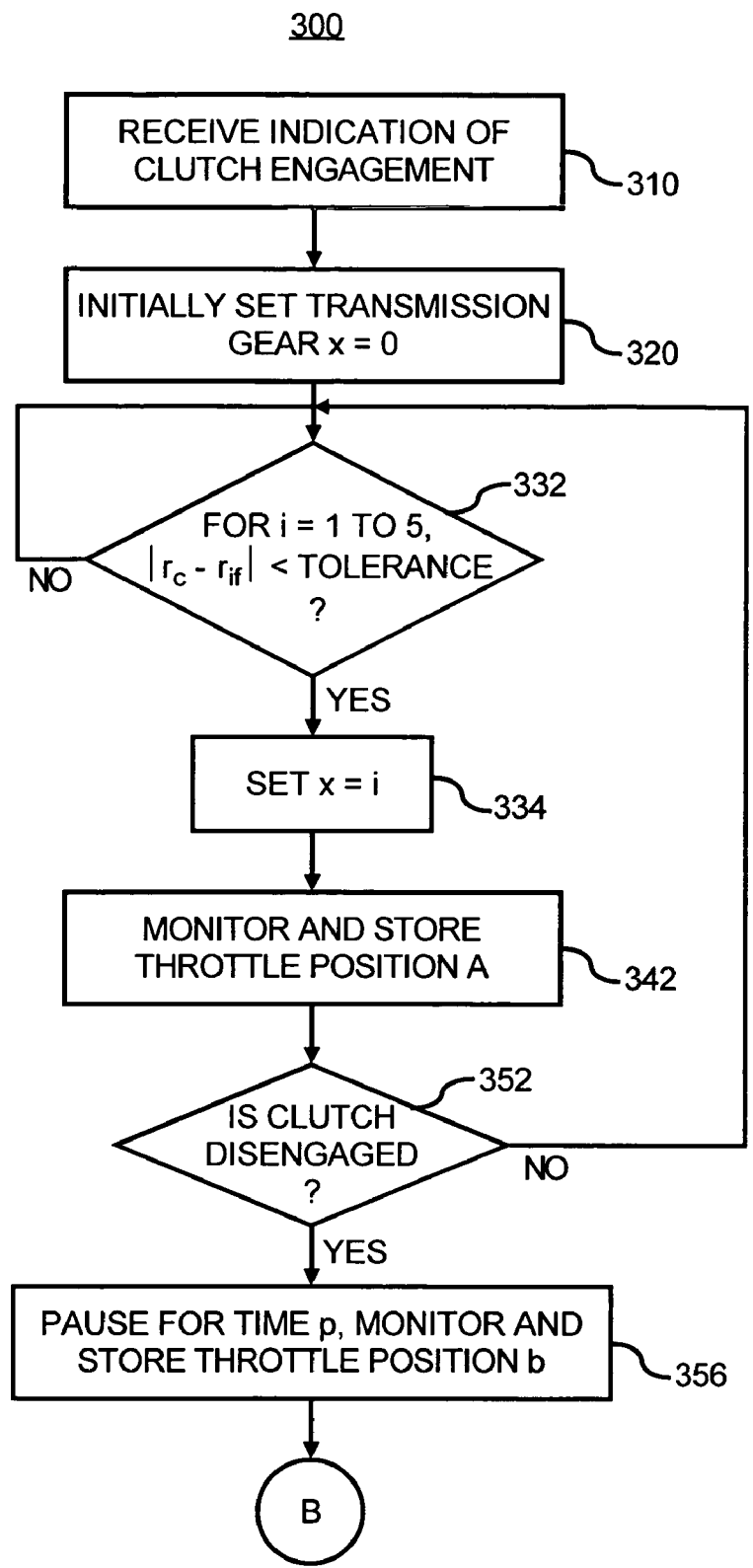
FIGS. 3a3b depict a process flow for matching engine speed to vehicle speed, in accordance with an embodiment of the present invention.

Referring now to the process flow 300 depicted in FIG. 3a. At 310, the ECU 58 receives an indication or confirmation of a clutch engagement, for example, by the vehicle operator, in a manner commonly understood in the art.

At 320, the ECU 58 initially sets a predetermined variable representing the selected transmission gear to zero because at this juncture the selected gear remains unknown to the ECU 58. For illustrative purposes, the predetermined variable is designated as x; thus, the ECU 58 sets x=0.

Next, the ECU 58 performs the following task(s). Regarding the first set of task(s), at 332 the ECU 58 initially designates another variable, for example, $r_c$, to be the observed or monitored ratio of engine speed to vehicle speed of the vehicle, i.e., the observed drivetrain speed ratio. Then, for each predetermined periodic reading of engine speed and vehicle speed at predefined time intervals, as provided by the aforementioned respective sensors in the drivetrain system 200, the ECU 58 compares the observed drivetrain speed ratio $r_c$ with the calculated drivetrain speed ratio $r_{if}$ associated with each transmission gear i=1 to 5, for example, for a five-speed manual transmission. At 334, if an observed speed ratio is found to be approximately equal to a drivetrain speed ratio, e.g., if the difference between the observed speed ratio and any one of the five predetermined drivetrain speed ratios in the five-speed manual transmission 37 is within a predetermined tolerance or threshold, then the ECU 58 assumes that the operator has selected the transmission gear associated with such a drivetrain speed ratio, and x is set to be x=i, where i is the transmission gear number (e.g., i=1 to 5 for a five-speed manual transmission). Otherwise, the ECU 58 continues to make such a determination for each periodic reading of the observed drivetrain speed ratio $r_c$. The aforementioned tolerance provides allowances for clutch slip and noise in the signals from the engine speed and vehicle speed sensors.

At 342, the ECU 58 monitors and periodically stores the position of the throttle input (e.g., gas pedal) from the operator, as available from an available throttle sensor. For illustrative purposes, the throttle input is designated as the variable a.

At 352 the ECU 58 further monitors the clutch position (e.g., clutch pedal) as input by the operator to await the receiving of clutch disengagement. At 356, once the clutch is disengaged, the system pauses for a predetermined short time p and then reads the throttle position again, whereby the throttle position is now designated as b. The pause is desired because the ECU 58 can take successive sensor readings more rapidly than the operator can manipulate the throttle and clutch inputs.

It should be noted that the observed drivetrain speed ratio r, of engine speed to vehicle speed is infinite when the vehicle is stopped but with the engine running. In such an instance, the ECU 58 continues to perform the first set of tasks 332, 334 of reading the engine speed and vehicle speed followed by a comparison to known drivetrain speed ratios. The operator generally moves forward from rest in first gear; however, the process flow 300 is applicable for the operator to start in any gear. Moreover, some clutch slip may be necessary to put the vehicle in motion without stalling the engine.

As shown in FIG. 3a and discussed above, once the clutch is fully engaged and no longer slipping (at 310), the ECU 58 is able to determine the gear that the operator has selected (at 332, 334). An example is now provided to illustrate a typical one-gear upshift. Suppose the operator initially has selected the first gear, i.e., x=1. Next, the operator accelerates in first gear to a speed at least equal to the minimum desired speed for a shift from first to second gear, and then initiates an upshift by partially releasing the throttle and disengaging the clutch. The operator releases the throttle further in order to reduce the speed of the flywheel 27 to match the speed of the clutch plate 29 that is to result from the upshift, whereby the operator moves the shift lever from first gear, through neutral, to second gear. The operator then re-engages the clutch to complete the upshift.

Figure 3B:
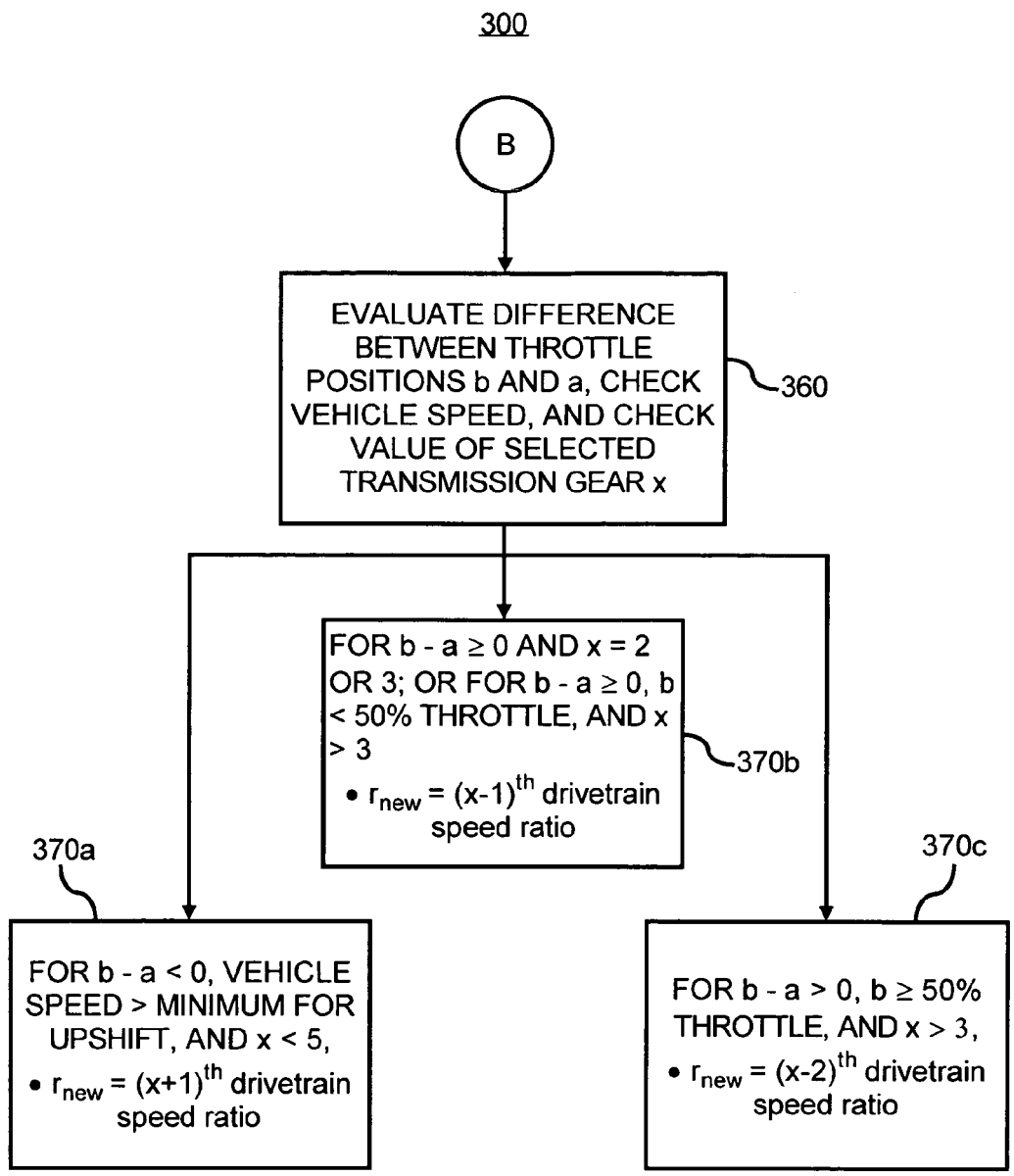

FIG. 3*b* depicts the process flow 300 as continued from FIG. 3*a*, in accordance with an embodiment of the present invention. The relative throttle positions a and b before and after a clutch disengagement (at 342 and 356, respectively, in FIG. 3*a*) are used to infer the intended shifting of the operator. Thus, at 360 the ECU 58 evaluates the difference between the stored throttle position readings, checks to see whether the vehicle speed is above a predetermined minimum for upshifting, and checks the currently selected transmission gear.

At 370*a*, the ECU 58 determines whether the operator intends to upshift based on the evaluation and checking at 360. If the previous throttle position "a" is greater than the current throttle position "b", i.e., b−a<0, the vehicle speed is above the predetermined minimum for an upshift, and the current gear is lower than the highest possible transmission gear, e.g., x<5, the ECU 58 infers that the operator intends a one-gear upshift, e.g., from first gear to second gear in the above example for upshifting, and the corresponding speed ratio $r_{new}$ of upshifted gear may be obtained. The ECU 58 makes a similar determination for upshifting from second to third gear, from third to fourth gear, and so on for any available higher gear that is less than the highest possible gear. The aforementioned minimum speed requirement for an upshift rev matching allows the operator to move at low speeds by successively engaging and disengaging the clutch while in first gear. In this situation, a clutch disengagement does not imply that the operator wishes to upshift. If the operator chooses to upshift before attaining minimum speed, the ECU 58 simply waits for a clutch engagement and resumes normal operation upon the clutch engagement.

In contrast to upshifting, downshifting may be executed out of sequence and follows one of several embodiments of the present invention, depending on the gear that is currently selected. Downshifting from second gear (x=2) or third gear (x=3) is assumed to be sequential, i.e., one-gear downshifting. For downshifting from fourth gear or above, it is assumed that the operator has the options of one-gear or two-gear downshift. The various embodiments of the present invention are applicable with either a single-clutch or double-clutch operation for a single-gear or two-gear downshift. Examples are provided below to illustrate typical single-clutch and double-clutch operations for single-gear and two-gear downshifts.

In the first example for a single-clutch operation to execute either a single-gear or double-gear downshift, suppose the vehicle is moving at a constant speed in third gear. The operator initiates a downshift by releasing the throttle and disengaging the clutch. The operator then increases the throttle to increase the speed of the clutch flywheel 27 to match the speed of the clutch plate 29 that is to result from the shift. Next, the operator moves the shift lever from third gear, through neutral, to second gear. Finally, the operator re-engages the clutch to complete the downshifting.

In the second example for a double-clutch operation to execute a single-gear downshift, suppose the vehicle is moving at a constant speed in third gear, the operator initiates a downshift by releasing the throttle and disengaging the clutch. The operator then increases the throttle to increase the speed of the clutch flywheel 27 to match the speed of clutch plate 29 that is to result from the shift. Next, the operator moves the shift lever from third gear to neutral. With the shift lever in neutral, the operator re-engages the clutch and then disengages the clutch again. This brings the transmission input shaft speed to a value needed to smoothly engage the second gear. The operator then further moves the shift lever from neutral to second gear. Finally, the operator re-engages the clutch to complete the down shifting.

In the third example for a double-clutch operation to execute a two-gear downshift, suppose the vehicle is moving at a constant speed in fourth gear. The operator initiates the two-gear downshift by completely releasing the throttle and disengaging the clutch. Next, the operator moves the shift lever from fourth gear to neutral. With the lever in neutral, the operator re-engages the clutch and increases the throttle to increase the speed of the transmission input shaft speed to the value needed to smoothly engage the second gear. The operator disengages the clutch again and moves the shift lever from neutral to second gear. Simultaneously, the operator manipulates the throttle to bring the speed of the clutch flywheel 27 to match the speed of the clutch plate 29 that is to result from the shift. Finally, the operator engages the clutch to complete the two-gear downshift.

Accordingly, referring back to FIG. 3*b*, at 370*b*, the ECU 58 determines whether the operator intends to downshift based on the evaluation and checking at 360. If the current throttle position "b" is equal to or greater than the previous throttle position "a", i.e., b−a≧0, the ECU 58 infers that the driver intends a one-gear downshift, from third gear to second gear in the example for downshifting, and the corresponding speed ratio $r_{new}$ of the downshifted gear may be obtained. It should be noted that the ECU 58 is further operable to perform a similar determination for a one-gear downshift from second gear to first gear. Thus, even if the operator completely releases the throttle before shifting and does not add throttle after the clutch is disengaged, i.e., b−a=0, the ECU 58 remains operable to infer that a one-gear downshift is desired. This allows the operator to easily downshift while braking or coasting down.

If the vehicle is traveling higher than third gear, e.g., in fourth or fifth gear, the operator has the options of one-gear or two-gear downshift, single-clutched or double-clutched. The difference between stored throttle positions "a" and "b" is also used to determine the operator's shift intent, with an additional rule to distinguish between one-gear and two-gear downshifts. Thus, again, at 370*b*, if the current throttle position "b" after the clutch disengagement is less than substantially 50% of maximum throttle, and it is equal to or greater than the throttle position "a" before the clutch disengagement, i.e., b−a≧0, the ECU 58 infers a one-gear downshift, and the corresponding speed ratio $r_{new}$ of the downshifted gear may be obtained.

At 370*c*, if the current throttle b after the clutch disengagement is substantially 50% of maximum throttle or greater, and it is greater than the throttle a before clutch disengagement, i.e., b−a≧0, the ECU 58 infers a two-gear downshift, and the corresponding speed ratio $r_{new}$ of the downshifted gear may be obtained.

Figure 4:
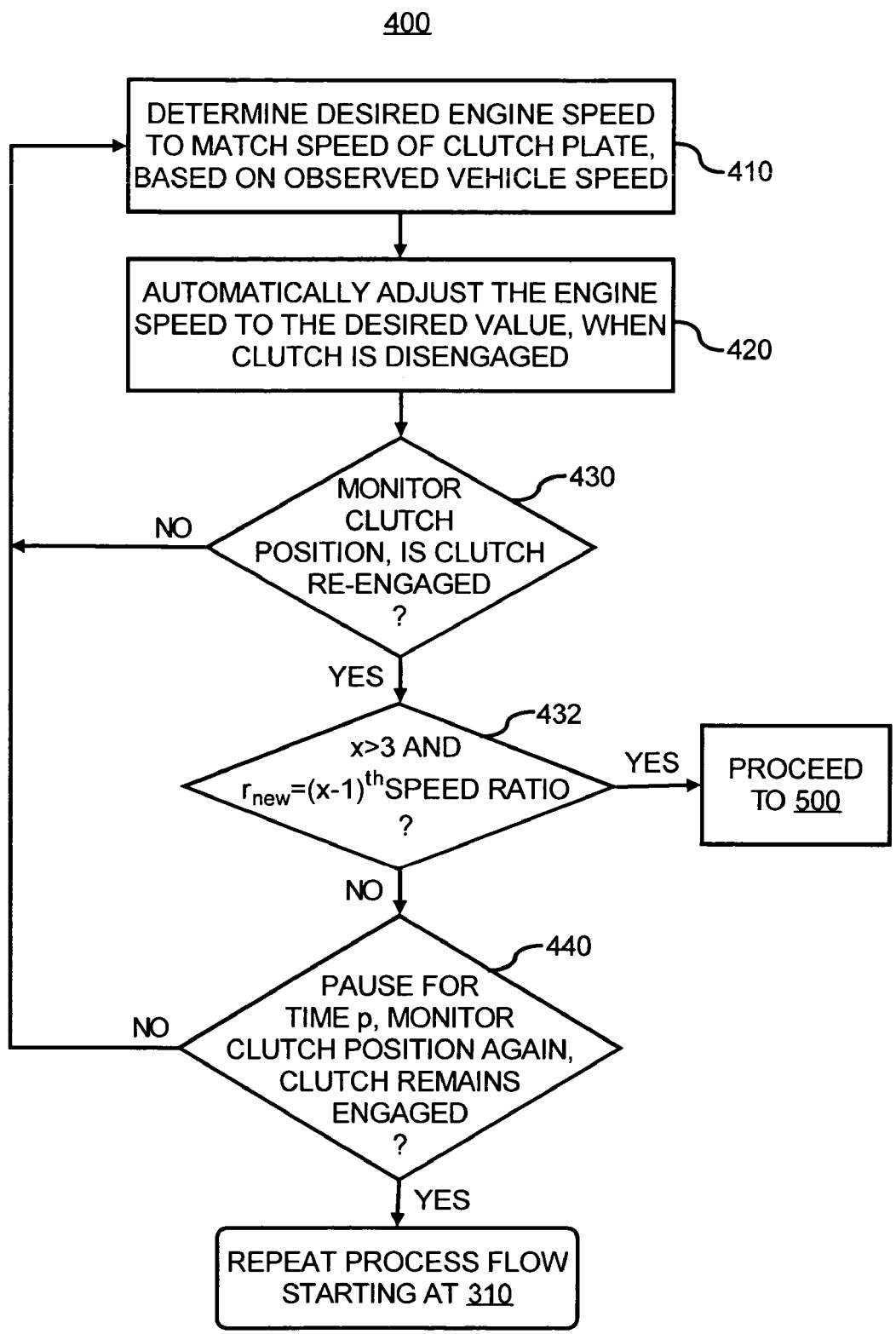
FIG. 4 depicts an additional process flow for matching engine speed to vehicle speed, in accordance with an embodiment of the present invention.

According to one embodiment of the present invention, once the operator's shift intent is determined, the ECU 58 executes additional procedures, as illustrated in the process flow 500 illustrated in FIG. 4.

At 410, the ECU 58 determines the engine speed at the engine output shaft 23 that is desired to match and achieve the speed of the clutch plate 29 upon a clutch engagement. The speed of the clutch plate 29 once an upshifted or downshifted gear is engaged is the product of the overall drivetrain speed ratio corresponding to such gear and the currently observed vehicle speed. This is given by the expression:

$$O_i = r_{if} * \text{vehicle speed} = r_i * r_f * \text{vehicle speed,}$$

where i is the transmission gear number as mentioned earlier. The vehicle speed, and, in turn, the desired engine speed are constantly updated while the clutch is disengaged, to account for the effects of terrain, aerodynamic drag, mechanical friction, etc.

At 420, the ECU 58 automatically adjusts the engine speed to the desired engine speed, i.e., the speed $O_i$ of the clutch plate 29, as long as the clutch is disengaged. The ECU 58 returns the engine speed control to the operator as soon as the clutch is re-engaged, regardless whether the desired engine speed is attained. If the desired engine speed is outside the acceptable range for the engine, engine speed control is also returned, and the ECU restarts process flow 300 at 310. Thus, for example, if the desired engine speed is determined to be below the idle speed in an upshift, the ECU 58 returns the engine speed control to the driver without waiting for a re-engagement of the clutch and awaits clutch engagement to begin the process again. Likewise, if the desired engine speed is determined to be above the engine redline in a downshift, the engine speed control is returned to the user immediately.

At 430, while the ECU 58 adjusts the engine speed to a desired speed when the clutch is disengaged, it also continuously monitors the clutch position on a predetermined periodic basis to determine when the clutch is re-engaged.

According to one embodiment of the present invention, in the case of a double-clutch operation for a single-gear downshift, the ECU 58 executes additional procedures in the process flow 400. Particularly, at 440, once the clutch is re-engaged in a double-clutch operation, the ECU 58 pauses for a predetermined short interval, p, and checks the clutch position again. If the clutch remains engaged, the ECU 58 infers that the operator is following a single-clutch operation and restarts the process flow 300 at 310. However, if the clutch is disengaged the second time, the ECU 58 infers that the operator is following a double-clutch operation. The ECU 58 then returns to the tasks of monitoring vehicle speed and determining-desired engine speed, acting to bring the engine to desired speed, and monitoring clutch position at 410, 420, and 430. Once the double-clutch downshift is complete, the operator leaves the clutch engaged, as with a single-clutch operation, and the ECU 58 re-executes the process flow 300 at 310.

In the case of a double-clutch operation for a two-gear downshift, the ECU 58 executes additional procedures to accommodate such a downshift. Particularly, because the operator does not add throttle after the first clutch disengagement (at 352, FIG. 3a), the ECU 58 at first infers that a one-gear downshift is desired, i.e., $r_{new} = (x-1)^{th}$ speed ratio. At 432, the ECU checks whether a one-gear downshift is inferred and whether the current gear is high enough that a two-gear downshift is a desired option e.g. fourth gear or higher (with downshifts from second and third gear assumed to be sequential). If both conditions are met, the ECU executes process flow 500. Engine speed control is returned to the operator upon a clutch re-engagement (at 430, FIG. 4). While the transmission is in neutral, the drivetrain speed is not related to engine speed. This fact is exploited by the ECU 58 in the process flow 500, as illustrated in FIG. 5.

Figure 5:
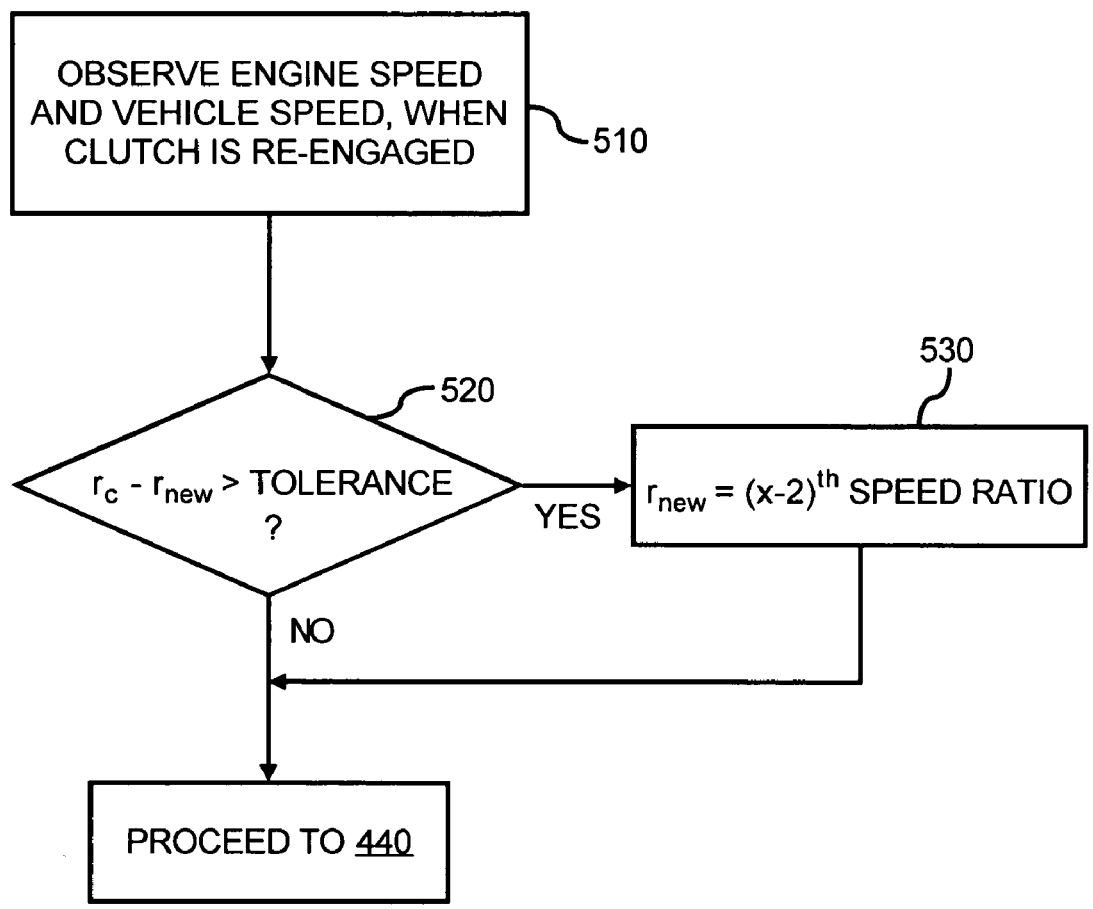
FIG. 5 depicts still an additional process flow for matching engine speed to vehicle speed, in accordance with an embodiment of the present invention.

Accordingly, in one embodiment of the present invention, as shown in the process flow 500 in FIG. 5, while the ECU 58 pauses for a predefined time p at 440, it continues to observe or monitor both the engine speed and the vehicle speed (at 510) to determine whether the observed engine speed rises above the drivetrain speed ratio for the next lower gear, e.g., third gear, and a predefined tolerance (at 520). If no, the ECU 58 continue to monitor the engine speed and the vehicle speed until the predefined time p runs out, and the ECU 58 makes a determination at 440 as described earlier. If yes, the ECU 58 is able to infer that a two-gear downshift, e.g., from fourth gear to second gear, is desired. Then, the ECU 58 redefines the corresponding speed ratio $r_{new}$ of the downshifted gear to the double downshifted gear, e.g., the second gear (at 530). Thus, referring back to FIG. 4, when the clutch is again disengaged by the operator, the ECU 58 returns to the tasks 410, 420, and 430 of monitoring the vehicle speed and determining desired engine speed as now redefined at 530 in FIG. 5, acting to bring the engine to such desired speed, and monitoring the clutch position. Once the shift is complete, the operator leaves the clutch engaged, the engine speed control is returned to the operator, and the ECU 58 executes the process flow 300 anew again It is possible to accomplish engine speed control during shifting with closed-loop control strategies known in the art, whereby the control variable is engine speed, and the reference variable is the desired engine speed that is determined by the various above embodiments of the present invention during shifting. Furthermore, a desired closed-loop control strategy for bringing actual engine speed to desired engine speed may be selected based on the type of engine in the vehicle. For example, the speed of a spark-ignition engine is generally controlled with an air throttle; whereas, the speed of a diesel engine is controlled by the rate of fuel delivery.

Figure 6:
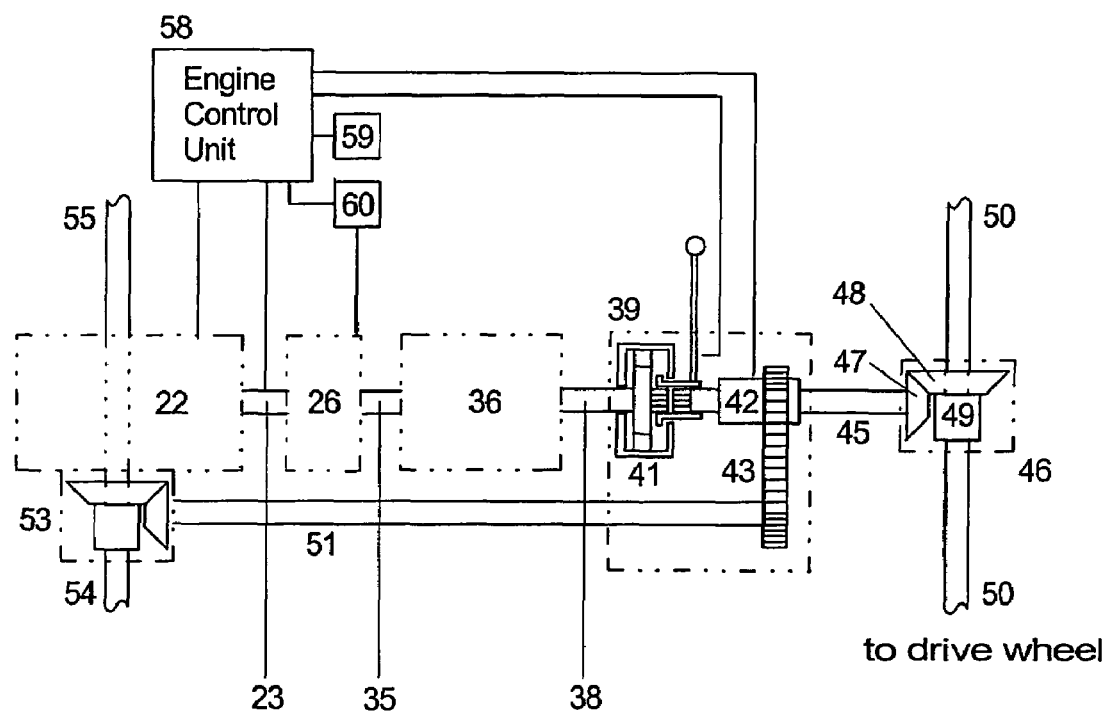
FIG. 6 depicts a typical drivetrain system in a full-time four-wheel-drive vehicle, to which various embodiments of the present invention are applicable.

FIG. 6 depicts a typical drivetrain system 600 in a full-time four-wheel-drive to which the method depicted in FIGS. 3-5 is also applicable. The drivetrain system 600 includes an engine 22 with an output shaft 23. A clutch assembly 26 selectively transmits engine torque to a transmission input shaft 35 driving a five-speed manual transmission 36 having a transmission output shaft 38, which feeds torque to full-time transfer case 39. A planetary gearset 41 allows the operator to choose between a lower transfer and a higher transfer ratio via a shifter. A center differential 42 apportions torque between a rear driveshaft 45 and a chain drive 43 driving a front driveshaft 51 and allows for speed differences between rear driveshaft 45 and front driveshaft 51. The rear driveshaft 45 drives a rear differential assembly 46 having a pinion gear 47, a ring gear 48, and a differential 49. The differential 49 apportions available torque and allows for speed differences between two half-shafts 50 that drive the vehicle's rear wheels. A front driveshaft 51 delivers torque to a front axle differential assembly 53, which apportions available torque and allows for speed differences between a right front half-shaft 54 and a left front half-shaft 55 that drive the front wheels. As with the drivetrain system 200 in FIG. 2, the ECU 58 uses a known method to control the speed of the engine 22. The ECU 58 senses engine speed at engine output shaft 23, the vehicle speed at the center differential 42, the transfer ratio selection at the planetary gearset 41, the throttle position at 59, and the clutch position on the clutch master cylinder 60 via sensors typically employed in the art.

Again, let the ratios of the transmission input speed (engine speed) to the transmission output speed be designated as $r_1, r_2, r_3, r_4,$ and $r_5$. The planetary gearset 41 forms a lower transfer ratio $r_{t,low}$ and a higher transfer ratio $r_{t,high}$. Hence, the overall speed ratios of the drivetrain and corresponding designations are:

| | |
|---|---|
| $r_{1Lf} = r_1 * r_{t,\,low}$ | 1L |
| $r_{2Lf} = r_2 * r_{t,\,low}$ | 2L |
| $r_{3Lf} = r_3 * r_{t,\,low}$ | 3L |
| $r_{4Lf} = r_4 * r_{t,\,low}$ | 4L |
| $r_{5Lf} = r_5 * r_{t,\,low}$ | 5L |
| $r_{1Hf} = r_1 * r_{t,\,high}$ | 1H |
| $r_{1Hf} = r_2 * r_{t,\,high}$ | 2H |
| $r_{1Hf} = r_3 * r_{t,\,high}$ | 3H |
| $r_{1Hf} = r_4 * r_{t,\,high}$ | 4H |
| $r_{1Hf} = r_5 * r_{t,\,high}$ | 5H |

A sensor is typically provided to indicate to the operator, e.g., to illuminate an indicator light on the vehicle dashboard, when the lower transfer ratio is selected. The ECU 58 uses the output of this sensor to select an appropriate set of drivetrain speed ratios for comparison with the observed speed ratio. For example, if the sensor indicates that low range is selected, the ECU would compare the observed speed ratio to the known speed ratios of 1L, 2L, 3L, 4L, and 5L. In an alternative embodiment, no indication of a transfer ratio selection is provided. Both the transfer ratio and selected transmission ratio are determined from the ratio of engine speed to vehicle speed. In this alternative embodiment, the ECU compares the observed speed ratio to all ten known drivetrain ratios.

According to one embodiment of the present invention, two separate minimum speed requirements for upshift rev matching are to be set depending on whether the current gear, x, is determined to be 1L or 1H. The ECU 58 infers that shifts made with the clutch while the vehicle is in motion only involve a transmission gear change. Thus, neither an upshift from 5L nor a downshift from 1H is recognized, even though there are combinations of transmission ratio and transfer ratio that are higher than 5L or lower than 1H. However, the operator is able to shift the transfer ratio without the clutch and, thus, without any required execution of the process flows depicted in FIGS. 3-5. Consequently, the process flows are operable to incorporate the new drivetrain speed ratio and the signal from the transfer case and update the determination of the selected gear accordingly for execution in a manner consistent with the aforementioned discussion of such process flows.

Figure 7:
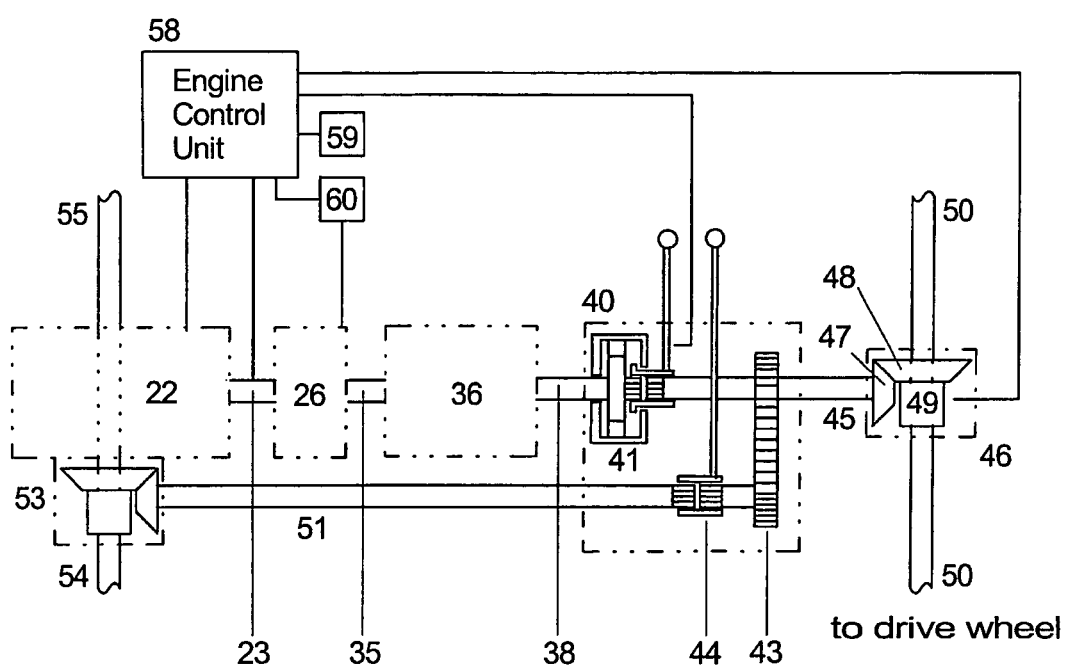
FIG. 7 depicts a typical drivetrain system in a part-time four-wheel-drive vehicle, to which various embodiments of the present invention are applicable.

FIG. 7 depicts a typical drivetrain system 700 in a part-time four-wheel-drive to which the process flows depicted in FIGS. 3-5 are similarly applicable. The drivetrain system 700 includes an engine 22 with an output shaft 23. A clutch assembly 26 selectively transmits engine torque to a transmission input shaft 35 driving a five-speed manual transmission 36 having a transmission output shaft 38, which feeds torque to a part-time transfer case 40. The planetary gearset 41 allows the operator to choose between a lower transfer and a higher transfer ratio via a shifter. A chain drive 43 delivers torque to a dog clutch 44 that selectively engages a front driveshaft 51 with shifter input from the operator. Because there is no allowance for speed differentials between the front and rear driveshafts, the vehicle is to operate on dry pavement in the 2-wheel-drive mode, i.e. with the dog clutch 44 disengaged. The rear driveshaft 45 drives a rear differential assembly 46 having a pinion gear 47, a ring gear 48, and a differential 49. The differential 49 apportions available torque and allows for speed differences between two half-shafts 50 that drive the vehicle's rear wheels. The front driveshaft 51 delivers torque to a front axle differential assembly 53, which apportions available torque and allows for speed differences between the right front half-shaft 54 and the left front half-shaft 55 that drive the front wheels. As mentioned earlier, the ECU 58 may employ any known method to control the speed of engine 22. Again, the ECU 58 senses the engine speed at the engine output shaft 23, the vehicle speed at a rear differential 49, the transfer ratio selection at the planetary gearset 41, the throttle position at 59, and the clutch position on clutch master cylinder 60 with typical sensors available and understood in the art.

Let the ratios of transmission input speed (engine speed) to transmission output speed be designated as $r_1, r_2, r_3, r_4$, and $r_5$. The planetary gearset 41 forms lower transfer ratio $r_{t,low}$ and higher transfer ratio $r_{t,high}$. The ring gear 48 and the pinion gear 47 form a final drive ratio $r_f$. Hence, the overall speed ratios of the drivetrain and corresponding designations are:

| | |
|---|---|
| $r_{1Lf} = r_1 * r_{t,\,low} * r_f$ | 1L |
| $r_{1Lf} = r_2 * r_{t,\,low} * r_f$ | 2L |
| $r_{1Lf} = r_3 * r_{t,\,low} * r_f$ | 3L |
| $r_{1Lf} = r_4 * r_{t,\,low} * r_f$ | 4L |
| $r_{1Lf} = r_5 * r_{t,\,low} * r_f$ | 5L |
| $r_{1Hf} = r_1 * r_{t,\,high} * r_f$ | 1H |
| $r_{1Hf} = r_2 * r_{t,\,high} * r_f$ | 2H |
| $r_{1Hf} = r_3 * r_{t,\,high} * r_f$ | 3H |
| $r_{1Hf} = r_4 * r_{t,\,high} * r_f$ | 4H |
| $r_{1Hf} = r_5 * r_{t,\,high} * r_f$ | 5H |

In an alternative embodiment, the vehicle speed is sensed on the rear driveshaft 45 instead of the differential 49. The overall speed ratios of the drivetrain are the same as above but without the required $r_f$ term for each ratio.

A sensor is typically provided to indicate to the operator, e.g., by illuminating an indicator light on the vehicle dashboard, when the lower transfer ratio is selected. The ECU 58 uses the output of this sensor to select the appropriate set of drivetrain speed ratios for comparison with the observed speed ratio. Again, two separate minimum speed requirements for upshift rev matching are to be set depending on whether the current gear, x, is determined to be 1L or 1H. The ECU 58 infers that shifts made with the clutch while the vehicle is in motion only involve a transmission gear change. Thus, neither an upshift from 5L nor a downshift from 1H are to be recognized, even though there are combinations of transmission ratio and transfer ratio that are higher than 5L or lower than 1H. However, the operator is able to shift the transfer ratio without the clutch and, therefore, without any alteration to the process flows depicted in FIGS. 3-5. Consequently, the process flows are operable to observe the new drivetrain speed ratio and the signal from the transfer case and update the determination of the selected gear accordingly for execution in a manner consistent with the aforementioned description for such process flows.

Figure 8:
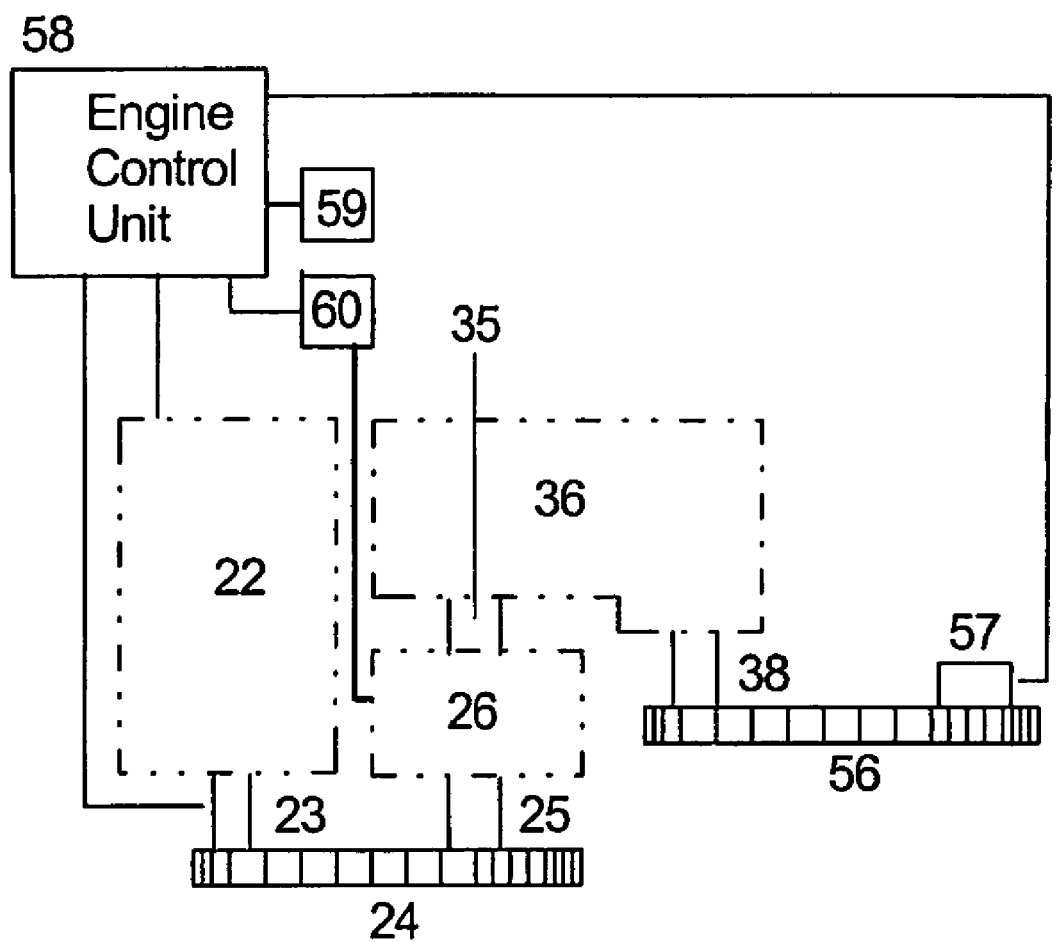
FIG. 8 depicts a typical motorcycle drivetrain system, to which various embodiments of the present invention are applicable.

FIG. 8 depicts a typical motorcycle drivetrain system 800 to which the process flows depicted FIGS. 3-5 are similarly applicable. The drivetrain system 800 includes engine 22 with an output shaft 23 driving a primary drive 24, which in turn drives a shaft 25, which drives a clutch assembly 26. An input shaft 35 drives a multiple-speed manual transmission 36 having an output shaft 38, which drives a final drive 56, which drives a rear wheel hub 57. As mentioned earlier, the ECU 58 may employ any known method to control the speed of the engine 22. The ECU 58 senses the engine speed at the engine output shaft 23, the vehicle speed at the rear wheel hub 57, the throttle position at 59, and the clutch position on the clutch master cylinder 60 with typical sensors available and understood in the art.

Let the ratios of transmission input speed (engine speed) to transmission output speed be designated as $r_1, r_2, r_3, r_4$, and $r_5$. The primary drive 24 includes a chain connecting two sprockets, which form a primary drive ratio $r_p$. The final drive 56 includes a chain connecting two sprockets, which form a final drive ratio $r_f$. Hence, the applicable speed ratios of the drivetrain and corresponding designations are:

| | |
|---|---|
| $r_p * r_1 * r_f$ | first |
| $r_p * r_2 * r_f$ | second |
| $r_p * r_3 * r_f$ | third |
| $r_p * r_4 * r_f$ | fourth |
| $r_p * r_5 * r_f$ | fifth |

In an alternative embodiment, the vehicle speed is sensed on the transmission output shaft 38 instead of the rear wheel hub 57. The overall speed ratios of the drivetrain are the same as above but without the required $r_f$ term for each ratio.

Motorcycles are typically equipped with sequential gear selector mechanisms, which do not allow the option of a two-gear downshift and do not have a neutral position, making double-clutched downshifts impossible. Some cars are equipped with sequential transmissions as well. For vehicles with a sequential transmission, the ECU 58 infers a one-gear downshift if the throttle position after a clutch disengagement is equal or greater than the throttle position prior to the clutch disengagement. Thus, the process flows depicted in FIGS. 3-5 are also applicable here, but without the additional procedures for any two-gear downshift or for any double-clutched downshift.

There are other available drivetrain systems for cars, trucks, and motorcycles. For example, front-wheel-drive cars combine the transmission and the differential assembly into one unit known as a transaxle. Another system option is the number of transmission gears. The examples provided herein to explain various embodiments of the present invention assume that the transmission has five speeds. However, it should be understood that such embodiments are similarly applicable for a transmission with a different number of gear ratios. Furthermore, as exemplified herein, two-gear downshifts are allowed from fourth and higher gears; however, such downshifts may be allowed from third gear on up as well.

In recap, the process flows depicted in FIGS. 3-5 are applicable to all drivetrain systems, with corresponding calculations for the applicable drivetrain speed ratios and, by extension, the determination of a desired engine speed during shifting for each drivetrain systems.

What has been described and illustrated herein are embodiments along with some of their variations. The terms, descriptions and Figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method for controlling the operation of a vehicle having a drivetrain system, wherein the drivetrain system includes an engine, a engine speed sensor that detects a speed of the engine, a manual transmission, a clutch coupled to the engine and the manual transmission, a clutch sensor to detect an engagement or disengagement of the clutch, a vehicle speed sensor coupled to the vehicle to detect a speed of the vehicle, a throttle input, and a throttle sensor that detects a throttle position of the throttle input; the method comprising steps of:
   (a) detecting a first engagement of the clutch from the clutch sensor;
   (b) detecting a first speed of the vehicle with the vehicle speed sensor, with the clutch in the first engagement;
   (c) detecting a first engine speed of the engine with the engine speed sensor, with the clutch in the first engagement;
   (d) determining a selected transmission gear of the manual transmission based on at least the first vehicle speed and the first engine speed;
   e) detecting and storing a first throttle position of the throttle input with the throttle sensor, with the clutch in the first engagement;
   (f) detecting a first disengagement of the clutch with the clutch sensor subsequent to the first engagement;
   (g) detecting and storing a second throttle position of the throttle input with the throttle sensor, with the clutch in the first disengagement;
   (h) detecting a second speed of the vehicle with the vehicle speed sensor, with the clutch in the first disengagement;
   (i) determining a next intended transmission gear of the manual transmission based on at least the first throttle position, the second throttle position, and the selected transmission gear;
   (j) determining a desired value for the engine speed of the engine based on the next intended transmission gear and the second vehicle speed;
   (k) automatically adjusting the engine speed to achieve the desired value;
   (l) detecting with the clutch sensor whether the clutch is re-engaged in a second engagement subsequent to the first disengagement; and
   (m) upon a detection that the clutch is in a second engagement, repeating the method from step a.

2. The method of claim 1, wherein upon the detection that the clutch is in the second engagement and prior to the step of repeating the method from step a, the method further comprises the step of:
   (n) further detecting with the clutch sensor whether the clutch remains in the second engagement or in a second disengagement subsequent to the second engagement, after a predetermined time.

3. The method of claim 2, further comprising the step of:
   upon a further detection that the clutch remains in the second engagement after the predetermined time, proceeding with the step of repeating the method from step a.

4. The method of claim 2, further comprising the step of:
   upon a further detection that the clutch is in the second disengagement, repeating the method from step j.

5. The method of claim 2, further comprising the step of:
   detecting a third speed of the vehicle with the vehicle speed sensor, with the clutch in the second engagement;
   detecting a second engine speed of the engine with engine speed sensor, with the clutch in the second engagement; and
   determining whether the second engine speed is greater than a sum of a predetermined tolerance and a product, wherein the product is a product of the third vehicle speed and a drivetrain speed ratio of an adjacent lower transmission gear of the selected transmission gear.

6. The method of claim 5, further comprising the step of:
upon a determination that the second engine speed is greater than the sum, determining a next transmission gear that is two gears lower than the selected transmission gear and proceeding with step (n) in the method.

7. The method of claim 5, further comprising the step of:
upon a determination that the second engine speed is less than or equal to the sum, proceeding with step n in the method.

8. The method of claim 1, wherein the step d of determining the selected transmission gear comprises the steps of:
determining an observed drivetrain speed ratio of the first engine speed to the first vehicle speed;
calculating a drivetrain speed ratio of each one a plurality of available transmission gears in the manual transmission;
comparing the observed drivetrain speed ratio to the calculated drivetrain speed ratio to find a match within a predetermined tolerance; and
determining the selected transmission gear based on the match.

9. The method of claim 1, wherein the step g of detecting and storing the second throttle position comprises the step of:
detecting and storing the second throttle position after a predetermined period of time subsequent to the detection of the first disengagement of the clutch.

10. The method of claim 1, wherein the step i of determining the next intended transmission gear comprises the steps of:
when the second throttle position is less than the first throttle position, the first vehicle speed is greater than a predetermined minimum speed for an upshift, and the selected transmission gear is less than a highest possible transmission gear in the manual transmission, setting the next intended transmission gear to be a next higher transmission gear to the selected transmission gear;
when the second throttle position is substantially equal to or greater than the first throttle position, and the selected transmission gear is a next higher transmission gear or second next higher transmission gear from a lowest possible transmission gear in the manual transmission, setting the next intended transmission gear to be one gear lower than the selected transmission gear;
when the second throttle position is substantially equal to or greater than the first throttle position, the second throttle position is less than 50% of a maximum possible throttle position of the throttle input, and the selected transmission gear is at least three gears higher up than the lowest possible transmission gear, setting the next intended transmission gear to be one gear lower than the selected transmission gear; and
when the second throttle position is greater than the first throttle position, the second throttle position is greater than 50% of a maximum possible throttle position of the throttle input, and the selected gear is at least three gears higher up than the lowest possible transmission gear, setting the next intended transmission gear to be two gears lower than the selected transmission gear.

11. A computer-readable medium on which is encoded program code for controlling the operation of a vehicle having a drivetrain system, wherein the drivetrain system includes an engine, a engine speed sensor that detects a speed of the engine, a manual transmission, a clutch coupled to the engine and the manual transmission, a clutch sensor to detect an engagement or disengagement of the clutch, a vehicle speed sensor coupled to the vehicle to detect a speed of the vehicle, a throttle input, and a throttle sensor that detects a throttle position of the throttle input; the program code comprising:
(a) program code for detecting a first engagement of the clutch from the clutch sensor;
(b) program code for detecting a first speed of the vehicle with the vehicle speed sensor, with the clutch in the first engagement;
(c) program code for detecting a first engine speed of the engine with the engine speed sensor, with the clutch in the first engagement;
(d) program code for determining a selected transmission gear of the manual transmission based on at least the first vehicle speed and the first engine speed;
(e) program code for detecting and storing a first throttle position of the throttle input with the throttle sensor, with the clutch in the first engagement;
(f) program code for detecting a first disengagement of the clutch with the clutch sensor subsequent to the first engagement;
(g) program code for detecting and storing a second throttle position of the throttle input with the throttle sensor, with the clutch in the first disengagement;
(h) program code for detecting a second speed of the vehicle with the vehicle speed sensor, with the clutch in the first disengagement;
(i) program code for determining a next intended transmission gear of the manual transmission based on at least the first throttle position, the second throttle position, and the selected transmission gear;
(j) program code for determining a desired value for the engine speed of the engine based on the next intended transmission gear and the second vehicle speed;
(k) program code for automatically adjusting the engine speed to achieve the desired value;
(l) program code for detecting with the clutch sensor whether the clutch is re-engaged in a second engagement subsequent to the first disengagement; and
(m) program code to go to the program code at (a) upon a detection that the clutch is in a second engagement.

12. The computer-readable medium of claim 11, further comprising:
(n) program code for further detecting with the clutch sensor whether the clutch remains in the second engagement or in a second disengagement subsequent to the second engagement, after a predetermined time, upon the detection that the clutch is in the second engagement and prior to an execution of the program code of repeating the program code starting from (a).

13. The computer-readable medium of claim 12, further comprising:
program code to go to the program code at (a) upon a further detection that the clutch remains in the second engagement after the predetermined time.

14. The computer-readable medium of claim 12, further comprising:
program code to go to the program code at (j) upon a further detection that the clutch is in the second disengagement.

15. The computer-readable medium of claim 12, further comprising:
program code for detecting a third speed of the vehicle with the vehicle speed sensor, with the clutch in the second engagement;
program code for detecting a second engine speed of the engine with engine speed sensor, with the clutch in the second engagement; and program code for determining whether the second engine speed is greater than a sum of a predetermined tolerance and a product, wherein the product is a product of the third vehicle speed and a drivetrain speed ratio of an adjacent lower transmission gear of the selected transmission gear.

16. The computer-readable medium of claim 15, further comprising:
program code for, upon a determination that the second engine speed is greater than the sum, determining a next transmission gear that is two gears lower than the selected transmission gear and proceeding with step (n) in the method.

17. The computer-readable medium of claim 15, further comprising:
program code for, upon a determination that the second engine speed is less than or equal to the sum, proceeding with step (n) in the method.

18. The computer-readable medium of claim 11, wherein the program code for determining the selected transmission gear comprises:
program code for determining an observed drivetrain speed ratio of the first engine speed to the first vehicle speed;
program code for calculating a drivetrain speed ratio of each one a plurality of available transmission gears in the manual transmission;
program code for comparing the observed drivetrain speed ratio to the calculated drivetrain speed ratio to find a match within a predetermined tolerance; and
program code for determining the selected transmission gear based on the match.

19. The computer-readable medium of claim 11, wherein the program code for detecting and storing the second throttle position comprises:
program code for detecting and storing the second throttle position after a predetermined period of time subsequent to the detection of the first disengagement of the clutch.

20. The computer-readable medium of claim 11, wherein the program code for determining the next intended transmission gear comprises:
program code for, when the second throttle position is less than the first throttle position, the first vehicle speed is greater than a predetermined minimum speed for an upshift, and the selected transmission gear is less than a highest possible transmission gear in the manual transmission, setting the next intended transmission gear to be a next higher transmission gear to the selected transmission gear;
program code for, when the second throttle position is substantially equal to or greater than the first throttle position, and the selected transmission gear is a next higher transmission gear or second next higher transmission gear from a lowest possible transmission gear in the manual transmission, setting the next intended transmission gear to be one gear lower than the selected transmission gear;
program code for, when the second throttle position is substantially equal to or greater than the first throttle position, the second throttle position is less than 50% of a maximum possible throttle position of the throttle input, and the selected transmission gear is least three gears higher up than the lowest possible transmission gear, setting the next intended transmission gear to be one gear lower than the selected transmission gear; and
program code for, when the second throttle position is greater than the first throttle position, the second throttle position is greater than 50% of a maximum possible throttle position of the throttle input, and the selected gear at least three gears higher up than the lowest possible transmission gear, setting the next intended transmission gear to be two gears lower than the selected transmission gear.

* * * * *